US012755190B2

(12) United States Patent
Bellman et al.

(10) Patent No.: US 12,755,190 B2
(45) Date of Patent: Oct. 6, 2026

(54) LAG FEATURE

(71) Applicant: Early Warning Services, LLC, Scottsdale, AZ (US)

(72) Inventors: Jacob M. Bellman, Scottsdale, AZ (US); Dan M. Hayden, Mesa, AZ (US); Abhishek Chambe Venkatesh Murthy, Scottsdale, AZ (US); John M Kohoutek, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 1035 days.

(21) Appl. No.: 17/903,442

(22) Filed: Sep. 6, 2022

(65) Prior Publication Data

US 2023/0070736 A1 Mar. 9, 2023

Related U.S. Application Data

(60) Provisional application No. 63/241,342, filed on Sep. 7, 2021.

(51) Int. Cl.
*G06N 20/00* (2019.01)
*G06F 16/903* (2019.01)

(52) U.S. Cl.
CPC ....... *G06N 20/00* (2019.01); *G06F 16/90335* (2019.01)

(58) Field of Classification Search
CPC ............................ G06N 20/00; G06F 16/2477
See application file for complete search history.

(56) References Cited

U.S. PATENT DOCUMENTS

| | | | | |
|---|---|---|---|---|
| 12,306,909 | B1 * | 5/2025 | Matar | G06F 18/2163 |
| 2020/0193234 | A1 * | 6/2020 | Pai | G06F 16/904 |
| 2022/0222573 | A1 * | 7/2022 | Fry | G06N 20/00 |

* cited by examiner

*Primary Examiner* — Grace Park
(74) *Attorney, Agent, or Firm* — Kilpatrick Townsend & Stockton LLP

(57) ABSTRACT

A method of analyzing the effectiveness of a machine learning model may include executing a test procedure of a machine learning model comprising a plurality of input features. The machine learning model may include a lag feature associated with one of the plurality of input features. Executing the test procedure may include querying one or more data sources for historical data records associated with the input features. The lag feature may restrict a query for historical data records from at least one of the data sources to a predetermined time prior to a time of the test procedure of the machine learning model. Executing the test procedure may include receiving the historical data records from the one or more data sources at the machine learning model. Executing the test procedure may include generating an output of the machine learning model.

19 Claims, 3 Drawing Sheets

LAG FEATURE

CROSS-REFERENCES TO RELATED APPLICATIONS

This application claims the benefit of U.S. Provisional Application Ser. No. 63/241,342, filed on Sep. 7, 2021, entitled "LAG FEATURE", the disclosure of which is incorporated by reference herein in its entirety.

BACKGROUND OF THE INVENTION

When designing machine learning models, developers often rely on historical data records to test the performance of a given model. While the type of data present in these data records may mirror the type of data that will be collected and analyzed by the machine learning model in real-world settings, the use of historical data records may not properly simulate lag that may be present in real-world applications. For example, data records may not be updated in real-time and/or API calls may have lag built in. Additionally, lag may be introduced due to the time it takes to generate certain features and/or model calculations. As a result, production environments may test the machine learning models with more comprehensive and robust data records than what will actually be available to the machine learning model when implemented in a non-test environment. The discrepancy in data availability may limit the ability to evaluate whether the machine learning model's performance is adequate. Therefore, improvements in machine learning model testing to mirror real-world model deployment scenarios are desired.

BRIEF SUMMARY OF THE INVENTION

Embodiments of the present invention are directed to techniques for introducing lag into machine learning model test procedures to better simulate how the machine learning model will perform under real-world operating conditions. Embodiments may provide lag attributes that are associated with one or more model input features that may enable the test procedure to take into account any lag that may result from availability of data records from batch uploads, API calls, feature generation time, and/or other delays. Embodiments may enable better evaluation of the performance of the machine learning model early in development, and may provide an indication of how much lag the machine learning model may tolerate before performance degrades, which may provide developers an opportunity to adjust the machine learning model early in the development process. In the event where performance decrement is unacceptable, the technological sources of lag can be re-evaluated.

An aspect of the disclosure provides for a method of analyzing the effectiveness of a machine learning model, using one or more processors, comprising: executing a test procedure of a machine learning model comprising a plurality of input features and a lag feature associated with at least one of the plurality of input features, wherein executing the test procedure comprises: querying one or more data sources for historical data records associated with the plurality of input features, wherein the lag feature restricts a query for historical data records from at least one of the data sources to a predetermined time prior to a time of the test procedure of the machine learning model; receiving the historical data records from the one or more data sources at the machine learning model; and generating an output of the machine learning model. The method may further comprise adjusting the lag feature to a different predetermined time, executing an additional test procedure of the machine learning model, and analyzing the output of the test procedure with an output of the additional test procedure to determine how impactful the adjustment in the lag feature was to a result of the machine learning model. Analyzing the output may include generating a plurality of metrics for the test procedure and the additional test procedure and comparing the plurality of metrics from each test procedure to determine how impactful each test procedure was to the machine learning model. The method may further comprise adjusting the machine learning model based on the metrics of the test procedure and the additional test procedure. The predetermined time may be based on a known amount of lag associated with the at least one of the data sources. The predetermined time may be between about 3 hours and 48 hours. At least one of the plurality of input features may not be associated with a lag feature.

Another aspect of the disclosure provides for a method of analyzing the effectiveness of a machine learning model, the method comprising: executing a plurality of test procedures of a machine learning model comprising a plurality of input features and a lag feature associated with each of the input feature, wherein: each lag feature restricts a query for historical data records from at least one of a plurality of data sources to a different predetermined time prior to a time of at least one test procedure of the plurality of test procedures of the machine learning model than each of the other lag features; and executing each test procedure of the plurality of test procedures comprises: querying the plurality of data sources for historical data records associated with the input features; receiving the historical data records from the plurality of data sources at the machine learning model; and generating outputs of the machine learning model; and analyzing the outputs of each of the plurality of test procedures to determine how impactful each of the different predetermined times of the plurality of lag features were to a result of the machine learning model. The method may further comprise comparing the outputs of each of the plurality of test procedures to determine how impactful each test procedure was to the machine learning model. The method may further comprise adjusting the machine learning model based on the comparison of outputs. Each predetermined amount of time may be based on a known amount of lag associated with the at least one of the data sources. The predetermined time may be between about 3 hours and 48 hours. The plurality of test procedures may comprise every permutation of a preset number of predetermined times for each of the plurality of input features for which lag is being tested.

A yet further aspect of the disclosure provides system provides, comprising: one or more computing devices; and memory storing instructions, the instructions being executable by the one or more computing devices, wherein the one or more computing devices are configured to: executing a test procedure of a machine learning model comprising a plurality of input features and a lag feature associated with at least one of the plurality of input features, wherein executing the test procedure comprises: querying one or more data sources for historical data records associated with the plurality of input features, wherein the lag feature restricts a query for historical data records from at least one of the data sources to a predetermined time prior to a time of the test procedure of the machine learning model; receiving the historical data records from the one or more data sources at the machine learning model; and generating an output of the machine learning model. The system may further comprise adjusting the lag feature to a different predetermined time, executing an additional test procedure of the machine learning model, and analyzing the output of the test procedure with an output of the additional test procedure to determine how impactful the adjustment in the lag feature was to a result of the machine learning model. The system may further comprise generating a plurality of metrics for the test procedure and the additional test procedure and comparing the plurality of metrics from each test procedure to determine how impactful each test procedure was to the machine learning model. The system of claim may further comprise adjusting the machine learning model based on the metrics of the test procedure and the additional test procedure. The predetermined time may be based on a known amount of lag associated with the at least one of the data sources. The predetermined time may be between about 3 hours and 48 hours. At least one of the plurality of input features may not be associated with a lag feature.

DETAILED DESCRIPTION OF THE INVENTION

Figure 1:
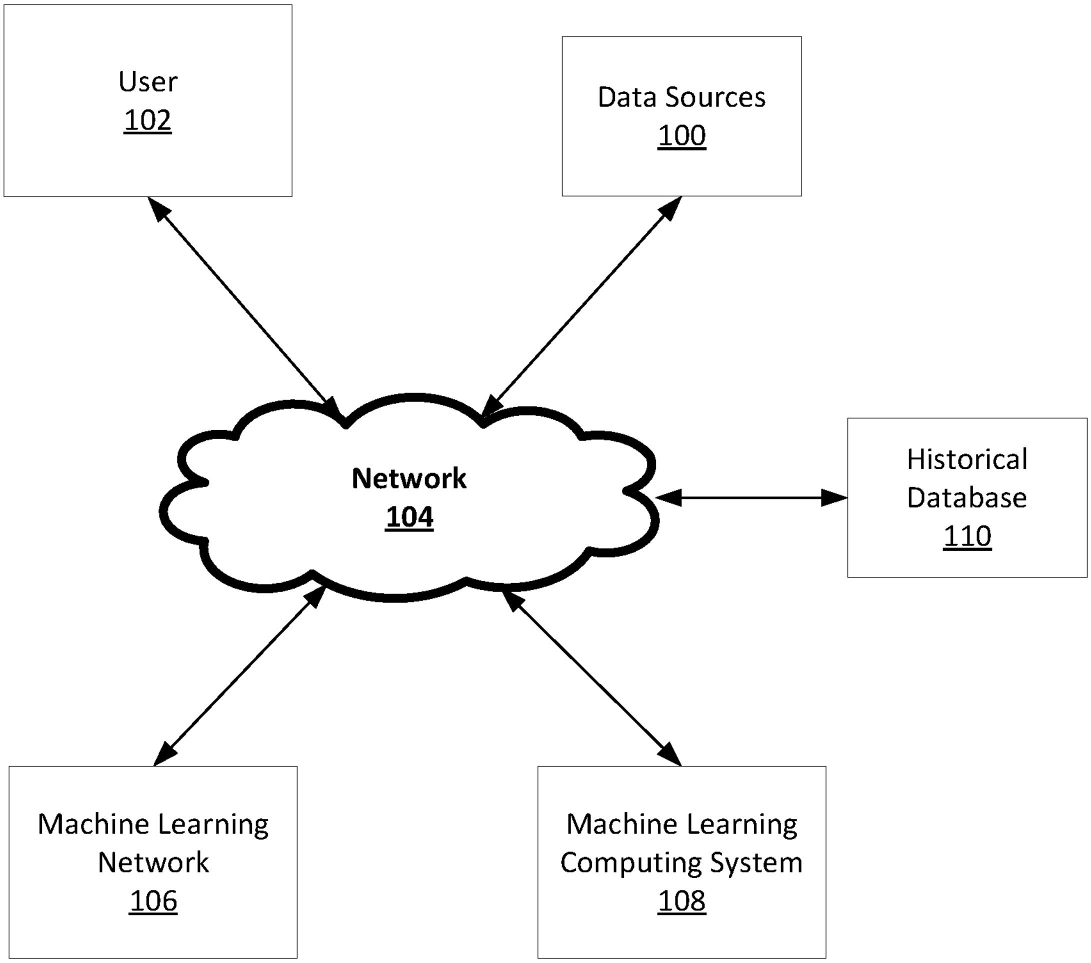
FIG. 1 illustrates a system for testing machine learning models according to an embodiment of the present invention.

Embodiments of the present invention are directed to techniques for introducing lag into machine learning models for testing purposes. Lag can come from a number of sources. For example, some APIs may introduce some amount of lag into the system. Lag may also be introduced by the time it takes to build features of the machine learning model. For example, depending on the amount of data included and/or the complexity of a particular feature, the feature may take significant amounts of time to be generated. This may lead to an output being generated much later than the build/execution time. To account for such time, the model may need to be executed at a time that enables the output to be generated by a particular deadline. Such time may need to be accounted for when sampling historical data, as the data records available at the time of execution may be different than the data records available at the time of the output. The predetermined time of the lag feature may be set to account for any amount of lag that may be introduced into the system.

In particular, embodiments may include lag features that limit the availability of data records that are used as input features to only that data that is available to the machine learning model at a predetermined time prior to the test procedure in order to simulate the effects of lag on the performance of the machine learning model. The amount of lag may vary from one test procedure to another to determine the machine learning model's tolerance for lag in one or more input features. Additionally, performance metrics dependent on lag attributes may be generated for each test procedure. These metrics may be analyzed to help determine whether the current model will produce adequate results when a predetermined amount of lag exists with one or more data sources and/or input features. This information may be used to determine if a given machine learning model needs to be modified and may help save considerable time in evaluating machine learning models in future tests.

In particular, the methods of the present disclosure more efficiently trains an optimal machine learning model for real-world use. Traditionally, machine learning models were trained using historical data records without any lag associated with those data records. However, there can often be a time lag when the model is in real-world use, thus rendering these traditional trained models suboptimal for real-world use. Further, while a model can be trained with lag using real-time data records, such data records are not as robust as historical data records. Accounting for lag in a machine learning model with real-time data, then, would take longer and provide a model that is less likely to account for all conditions than one trained with a historical data record. In contrast, the methods of the present disclosure introduce a lag feature into models to be trained while using historical data records so that a more accurate representation of real-world conditions can be tested with the more robust data record. In this manner, training a machine learning model that better accounts for the lag seen in real-world conditions can be trained with less time and is more well-rounded model than training a model using real-time data. As such, the methods of the present disclosure improves upon the technical field of machine learning.

While discussed herein largely in the context of machine learning models that are used to generate financial determinations, it will be appreciated that the lag features described herein may be utilized in testing machine learning algorithms in any other application, including other models, such as linear models where lag may occur when built in real-time.

Turning now to FIG. 1, a system for testing machine learning models is illustrated. The system may include one or more data sources 100. Data sources 100 may collect data records that may be relevant to a particular machine learning model outcome. For example, the data records may be used as, or to generate, input features for a machine learning model. In some embodiments, the data sources 100 may include financial institutions, such as banks, credit unions, brokerage firms, credit card issuers, and/or other entities that service financial accounts for consumers and/or businesses. The financial institutions may also encompass other entities that may operate financial accounts (including issuing and cashing checks and/or other negotiable instruments), offering lending and/or other financing options, and/or otherwise handle financial transactions. Each financial institution may include one or more computing systems that facilitate interactions with users and/or back-end systems. The financial institutions may each maintain records not only of balances associated with each account, but may also maintain records of transactions (e.g., debits and credits) associated with the various accounts, records of checks and/or other negotiable instruments (issued and/or cashed), bank account status records (e.g., when an account is closed), personally identifiable information (PII) data (such as DMV, address, email, phone, etc.), check and ACH returns, and/or maintain records of other financial data associated with one or more users. Such data may be collected once the user provides their consent. Additional or alternative data sources may be included in some embodiments. For example, other data sources may provide one or more types of data that may or may not be available (or readily identifiable) within account data from the financial institutions. This may include information about payroll checks/deposits, rent payments, mortgage payments, utility bill payments, and/or other information may be provided by additional data sources, such as payroll processors, utility companies, mortgage providers, financial technology (Fintech) companies and/or banking as a service platforms. It will be appreciated that in some embodiments, data sources that provide non-financial data may be included in the system as well. Such data may be used in generating machine learning model outcomes that are related financial determinations as discussed herein and/or may be used to generate any other kind of machine learning outcome.

In some embodiments, during testing of machine learning models, historical data records may be used rather than, or in addition to, actively polling other data sources. For example, data sources 100 may include one or more historical databases 110 and/or other sources of historical data records. The historical databases 110 may include historical data records that have been previously provided by other data sources 100 and may provide a readily available source of information for testing machine learning models, without the need to program the model to communicate with APIs of the other data sources 100 and/or without introducing any significant lag into a model that would otherwise slow down testing procedures. In some embodiments, a single historical database 110 that includes historical data records from any number and/or type of data sources 100 may be provided, while in other embodiments, a number of different historical databases may be provided. For example, each historical database 110 may include only historical data records associated with a given data source 100, type of data, and/or combination thereof. Other arrangements of historical databases may be used in various embodiments.

The system may include a number of users 102 that may interact with one or more of the financial institutions and/or other data sources 100. For example, the users 102 may maintain one or more financial accounts (checking accounts, savings accounts, credit card accounts, brokerage accounts, cryptocurrency accounts, etc.) at one or more of the financial institutions. Additionally, the users 102 may apply for loans/credit/financing, cash/deposit/issue checks, initiate transfers to and/or from one or more financial accounts, and/or otherwise interact with one or more of the financial institutions. The users 102 may be individuals and/or business entities. The users 102 may interact with the data sources 100 in person at brick and mortar locations and/or using one or more user devices that communicate with the data sources 100 via one or more wired and/or wireless networks 104. The user devices may include mobile phones, tablet computers, personal computers, e-readers, and the like. In some embodiments, the user devices may include computing devices, such as point of sale devices, that may be positioned at brick-and-mortar locations of a given data source 100 that may be usable by the users to interact with a given data source 100. The user devices may access the data sources 100 via software applications and/or websites that are associated with and/or operated by a given data source 100 and that provide user interfaces that enable the users to perform actions with the data source 100, such as to manage accounts, conduct transactions, and/or apply for funds when the data source 100 is a financial institution.

The system may include a machine learning network 106, which may be in direct and/or indirect communication with the data sources 100, user devices and/or users 102 via the one or more networks 104. The machine learning network 106 may establish relationships with any number of data sources 100, which may enable the machine learning network 106 to access data records (such as detailed account and/or transaction data) associated with each financial account and/or user 102. The machine learning network 106 may access and aggregate the data records from each of the financial accounts identified as being associated with one or more users 102 (e.g., payee and/or payor). This data may be parsed to identify inflow and outflow transactions associated with each financial account, balance data, transaction frequency data, and/or other category of data. The machine learning network 106 may use this data to automatically generate input features that may be supplied to a machine learning computing system 108 (which may or may not be part of and/or operated by the machine learning network 106) that uses a number of data records (such as a check or other negotiable instrument, loan/credit application, transaction, account information, etc.) as input features that are utilized to generate a given outcome. For example, the machine learning network 106 may analyze data records received from one or more of the data sources 100 to generate input features for the machine learning computing system 108, with the input features being relevant for predicting a particular outcome. Machine learning models may be designed that generate a probability of a given transaction being fraudulent, a likelihood that a given check or ACH transaction will return, a probability that an individual is a synthetic individual (e.g., an individual having a falsified identity), a probability that an individual's personally identifiable information (PII) is correct, an indication of a financial health of a business or other entity, a likelihood that a check is counterfeit, a likelihood that a check is a duplicate, a probability than an individual is a mule, a probability that an individual is a money launderer, a probability that a new account will commit fraud, a probability that a new account will cause a loss, and/or other financial and/or non-financial determination.

Figure 2:
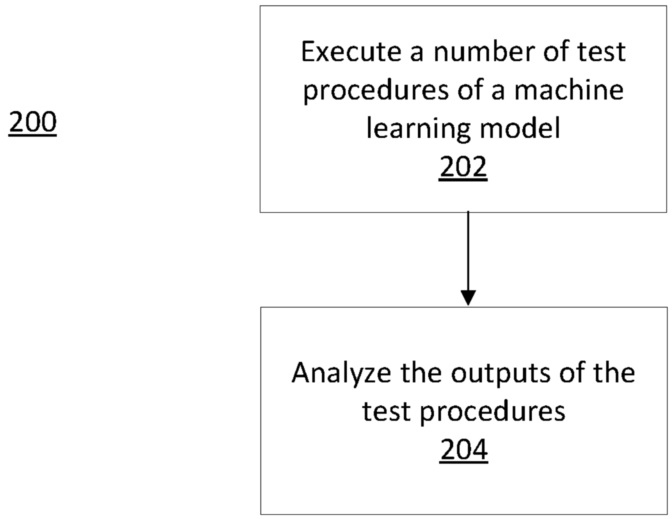
FIG. 2 is a flowchart illustrating a process for analyzing the effectiveness of a machine learning model according to an embodiment of the present invention.

FIG. 2 is a flowchart illustrating a process 200 of analyzing the effectiveness of a machine learning model according to an embodiment of the present invention. Process 200 may be performed by the machine learning network 106 and/or machine learning computer system 108. Process 200 may begin at operation 202 by executing a test procedure of a machine learning model that includes a number of input features. The machine learning model may include at least one lag feature, with each lag feature being associated with at least one of the input features. In some embodiments, at least one of the input features may not be associated with a lag feature.

Executing the testing procedure may include querying one or more data sources, such as data sources 100 and/or historical databases 110 for data records (oftentimes historical data records) associated with the input features. Each lag feature restricts a query for historical data records from at least one of the data sources to retrieve only those data records available at a predetermined time prior to a simulated time of the test procedure of the machine learning model. For example, when using historical data, the test procedure may be executed at a particular simulated time (which may be represented by a timestamp that occurred in the past in some embodiments). The lag feature may set the query for historical data to only retrieve historical data records that are at the predetermined time relative to the simulated time of the test procedure (e.g., such as based on the timestamp of the test procedure) to simulate possible lag that may occur when accessing data sources 100 in real-time. For example, the predetermined time of the lag feature may range from a number of milliseconds to a number of hours or days. In some embodiments, the predetermined time of the lag feature may be set based on an expected lag of a given input feature and/or data source 100. In other embodiments, the predetermined time may be set to different values, such as 1 hour, 3 hours, 6 hours, 9 hours, 12 hours, 24, hours, 36 hours, 48 hours, etc. In some embodiments, a lag feature may be set based on an average length of a known variable lag time, a median length of a known variable lag time, a modal length of a known variable lag time, and/or other metric.

In one example, to simulate a lag of 12 hours, the lag feature may cause the query to access only data records that were available 12 or more hours prior to the simulated time in order to simulate the actual availability of data records that may exist under real-world conditions, such as due to when data records are uploaded/updated. For example, some data sources 100 may update records periodically as batches, rather than in real-time, which may limit the availability of some records that may otherwise have been generated at the time of execution of the machine learning model.

Any number of test procedures of the machine learning model may be executed. Where multiple test procedures are executed, the predetermined time of one or more of the lag features may be adjusted to a different value. In some embodiments, only one of the lag features may be adjusted, while in other embodiments multiple (possibly all) lag features may be adjusted from one test procedure to another. In some embodiments, the machine learning model may automatically increment one or more of the lag features to a different predetermined time each test procedure. For example, the machine learning model may be programmed to cycle the lag features so as to test every permutation of a preset number of lag times for each of the input features for which lag is being tested. For example, a given model may include four input features that are associated with dedicated lag features, with each lag feature being tested with predetermined times of 0 hours (no lag), 12 hours, 24 hours, and 48 hours. During a first test procedure, the lag features for each input feature may be set to 0 hours, while in a second test procedure one of the lag features may be set to 12 hours. Subsequent test procedures may set the lag feature to 24 hours and then 48 hours. Such a pattern may be repeated for each of the lag features. Additionally, combinations of two, three, and/or four lag features may be altered in a given test procedure such that the machine learning model is tested with every possible permutation of the predetermined time values for each combination of the lag features to account for a variety of real-world lag conditions (e.g., 256 permutations for a four input feature by four lag time scenario). By testing some or all of the permutations, developers may determine a lag tolerance level of the machine learning model capable of making adjustments to the machine learning model prior to introducing the model to real-world conditions.

Executing each test procedure of the machine learning model may also include receiving the historical data records from the data sources at the machine learning model. As indicated above, any data records received from data sources associated with a given lag feature may be restricted to only those data records that were available at the predetermined time before the simulated test execution time, which may simulate the data availability for the machine learning model under real-world conditions. An output may be generated by the machine learning algorithm for each test procedure. The output may factor in the various data records received from the data sources and may be indicative of a given determination. For example, in financial scenarios, the output may include, but is not limited to, a probability of a given transaction being fraudulent, a likelihood that a given check or ACH transaction will return, a probability that an individual is a synthetic individual, a probability that an individual's personally identifiable information (PII) is correct, an indication of a financial health of a business or other entity, a likelihood that a check is counterfeit, a likelihood that a check is a duplicate, a probability than an individual is a mule, a probability that an individual is a money launderer, a probability that a new account will commit fraud, a probability that a new account will cause a loss, and/or other financial and/or other determination.

In some embodiments, the process may include analyzing the outputs of each of the test procedures at operation 204 to determine how impactful the different predetermined times of the lag features were to a result of the machine learning model. For example, the outputs of each test procedure may be compared to one another to see how the different lags affected the generated output. In some embodiments, the process may include generating one or more metrics for each test procedure that are indicative of a level of performance of the machine learning model (e.g., area under curve (AUC), Kolmogorov-Smirnov (KS) test, Information Value (IV), false positive ratio, precision, recall, accuracy, etc.). The metrics may be analyzed for each test procedure to determine what level of lag the machine learning model may tolerate for each of the input features, to determine an expected performance level of the machine learning model under real-world conditions, and/or how impactful each test procedure was to the model. For example, in some embodiments, a performance decrement curve may be produced that illustrates how the model performance is affected with different amounts of lag built in for one or more input features. In other embodiments, there may be other means of determining a performance of the machine learning model having introduced lag features. The outputs and metrics may help developers better understand and anticipate how lag will affect the machine learning model prior to testing with real-world data records. Since the historical data records can be more comprehensive and robust than what might be available using real-time data, considerable time and resources are saved in training a machine learning model with a lag feature using historical data records than a model trained with only the data records that may be available in real-time.

Based on the analysis of the outputs and/or the metrics, the machine learning model may be adjusted to better handle potential lag within the system. For example, where the performance decrement curve indicates that the performance of a model with a first lag feature performs better than the model with a second lag feature (or where the model does not have a lag feature at all), such as where the second lag feature has a greater impact on the model than the first lag feature, a computing system may send the model with the first lag feature to be used in real-world conditions rather than the model with the second lag feature. Alternatively, the computing system may adjust the second model to have the same feature as the first model (e.g., where the second model is already being used in real-time).

Figure 3:
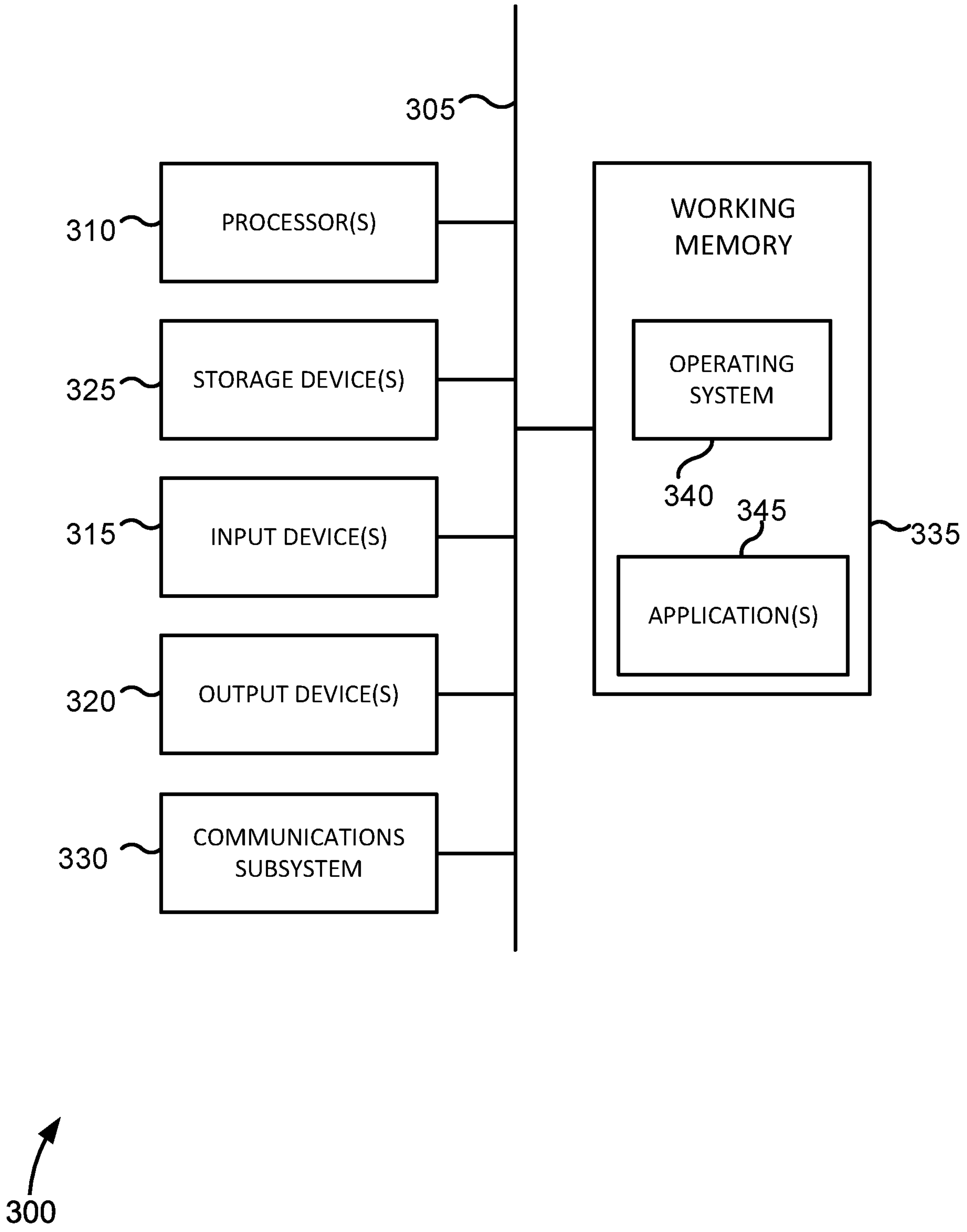
FIG. 3 is a block diagram of a computing system according to an embodiment of the present invention.

A computer system as illustrated in FIG. 3 may be incorporated as part of the previously described computerized devices. For example, computer system 300 can represent some of the components of computing devices, such as data sources 100, devices of the users 102, machine learning network 106, machine learning computing system 108, historical database 110, and/or other computing devices described herein. FIG. 3 provides a schematic illustration of one embodiment of a computer system 300 that can perform the methods provided by various other embodiments, as described herein. FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include a processing unit 310, including without limitation one or more processors, such as one or more central processing units (CPUs), graphical processing units (GPUs), special-purpose processors (such as digital signal processing chips, graphics acceleration processors, and/or the like); one or more input devices 315, which can include without limitation a keyboard, a touch-screen, receiver, a motion sensor, a camera, a smartcard reader, a contactless media reader, and/or the like; and one or more output devices 320, which can include without limitation a display device, a speaker, a printer, a writing module, and/or the like.

The computer system 300 may further include (and/or be in communication with) one or more non-transitory storage devices 325. The one or more non-transitory storage devices 325 can comprise, without limitation, local and/or network accessible storage, and/or can include, without limitation, a disk drive, a drive array, an optical storage device, a solid-state storage device such as a random access memory ("RAM") and/or a read-only memory ("ROM"). The one or more non-transitory storage devices 325 can be programmable, flash-updateable and/or the like. Such storage devices may be configured to implement any appropriate data stores, including without limitation, various file systems, database structures, and/or the like.

The computer system 300 might also include a communication interface 330, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 330 may permit data to be exchanged with a network (such as the network 104, to name one example), other computer systems, and/or any other devices described herein. Data transmitted across the networks 104 may be secured using encryption techniques, hypertext transfer protocol secure (HTTPS), secure sockets layer (SSL), transport layer security (TLS), and/or other security protocol. In many embodiments, the computer system 300 will further comprise a non-transitory working memory 335, which can include a RAM or ROM device, as described above.

The computer system 300 also can comprise software elements, shown as being currently located within the working memory 335, including an operating system 340, device drivers, executable libraries, and/or other code/instructions, such as one or more application programs 345 and/or a machine learning algorithm. Such code/instructions may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 325 described above. In some cases, the storage medium might be incorporated within a computer system, such as computer system 300. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a feature generation engine configured to provide some or all of the features described herein (e.g., a lag feature) can comprise hardware and/or software that is specialized (e.g., an application-specific integrated circuit (ASIC), a software method, etc.) or generic (e.g., processing unit 310, applications 345, etc.) Further, connection to other computing devices such as network input/output devices may be employed.

Some embodiments may employ a computer system (such as the computer system 300) to perform methods in accordance with the disclosure. For example, some or all of the procedures of the described methods may be performed by the computer system 300 in response to processing unit 310 executing one or more sequences of one or more instructions (which might be incorporated into the operating system 340 and/or other code, such as an application program 345) contained in the working memory 335. Such instructions may be read into the working memory 335 from another computer-readable medium, such as one or more of the storage device(s) 325. Merely by way of example, execution of the sequences of instructions contained in the working memory 335 might cause the processing unit 310 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 300, various computer-readable media might be involved in providing instructions/code to processing unit 310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 325. Volatile media include, without limitation, dynamic memory, such as the working memory 335. Transmission media include, without limitation, coaxial cables, copper wire, and fiber optics, including the wires that comprise the bus 305, as well as the various components of the communication interface 330 (and/or the media by which the communication interface 330 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 330 (and/or components thereof) generally will receive the signals, and the bus 305 then might carry the signals (and/or the data, instructions, etc. carried by the signals) to the working memory 335, from which the processor(s) 310 retrieves and executes the instructions. The instructions received by the working memory 335 may optionally be stored on a non-transitory storage device 325 either before or after execution by the processing unit 310.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of analyzing the effectiveness of a machine learning model, using one or more processors, comprising:

executing a test procedure of a machine learning model comprising a plurality of input features and a lag feature associated with at least one of the plurality of input features, wherein executing the test procedure comprises:

querying one or more data sources for historical data records associated with the plurality of input features;

simulating effects of lag on a performance of the machine learning model when operated under real-world conditions by using the lag feature to restrict a query for historical data records from at least one of the data sources to only historical data records available at a predetermined time prior to a time of the test procedure of the machine learning model, wherein the predetermined time is based on a known amount of lag associated with the at least one of the data sources;

receiving the historical data records from the one or more data sources at the machine learning model;

generating an output of the machine learning model; and generating one or more performance metrics of the machine learning model that are dependent on lag attributes based on the output of the machine learning model, wherein the one or more performance metrics comprise a performance decrement curve that illustrates how the performance of the machine learning model is affected with different amounts of lag built in for the at least one of the plurality of input features.

2. The method of analyzing the effectiveness of a machine learning model of claim 1, further comprising:

adjusting the lag feature to a different predetermined time;

executing an additional test procedure of the machine learning model; and analyzing the output of the test procedure with an output of the additional test procedure to determine how impactful the adjustment in the lag feature was to a result of the machine learning model.

3. The method of analyzing the effectiveness of a machine learning model of claim 2, wherein analyzing the output includes:

generating a plurality of metrics for the test procedure and the additional test procedure; and comparing the plurality of metrics from each test procedure to determine how impactful each test procedure was to the machine learning model.

4. The method of analyzing the effectiveness of a machine learning model of claim 3, further comprising:

adjusting the machine learning model based on the metrics of the test procedure and the additional test procedure.

5. The method of analyzing the effectiveness of a machine learning model of claim 1, wherein:

the predetermined time is between about 3 hours and 48 hours.

6. The method of analyzing the effectiveness of a machine learning model of claim 1, wherein:

at least one of the plurality of input features is not associated with a lag feature.

7. The method of analyzing the effectiveness of a machine learning model of claim 1, further comprising:

analyzing the one or more performance metrics to determine level of lag tolerance of the machine learning model for the at least one of the plurality of input features.

8. The method of analyzing the effectiveness of a machine learning model of claim 1, further comprising:

analyzing the one or more performance metrics to determine an expected performance level of the machine learning model under real-world conditions.

9. A method of analyzing the effectiveness of a machine learning model, the method comprising:

executing a plurality of test procedures of a machine learning model comprising a plurality of input features and a lag feature associated with each of the input features, wherein:

executing each test procedure of the plurality of test procedures comprises:

querying a plurality of data sources for historical data records associated with the input features;

simulating effects of lag on a performance of the machine learning model when operated under real-world conditions by using each lag feature to restrict a query for historical data records from at least one of the data sources to only historical data records available at a predetermined time prior to a time of the test procedure of the machine learning model, wherein the predetermined time is based on a known amount of lag associated with the at least one of the data sources;

receiving the historical data records from the plurality of data sources at the machine learning model; and generating outputs of the machine learning model; and analyzing the outputs of each of the plurality of test procedures to determine how impactful each of the different predetermined times of the plurality of lag features were to a result of the machine learning model, wherein:

analyzing the outputs comprises generating one or more performance metrics of the machine learning model that are dependent on lag attributes based on the outputs of the machine learning model; and the one or more performance metrics comprise a performance decrement curve that illustrates how the performance of the machine learning model is affected with different amounts of lag built in for one or more of the plurality of input features.

10. The method of analyzing the effectiveness of a machine learning model of claim 9, further comprising:

comparing the outputs of each of the plurality of test procedures to determine how impactful each test procedure was to the machine learning model.

11. The method of analyzing the effectiveness of a machine learning model of claim 10, further comprising:

adjusting the machine learning model based on the comparison of outputs.

12. The method of analyzing the effectiveness of a machine learning model of claim 9, wherein:

the predetermined time is between about 3 hours and 48 hours.

13. The method of analyzing the effectiveness of a machine learning model of claim 9, wherein:

the plurality of test procedures comprise every permutation of a preset number of predetermined times for each of the plurality of input features for which lag is being tested.

14. A system, comprising:

one or more computing devices; and memory storing instructions, the instructions being executable by the one or more computing devices, wherein the one or more computing devices are configured to:

executing a test procedure of a machine learning model comprising a plurality of input features and a lag feature associated with at least one of the plurality of input features, wherein executing the test procedure comprises:

querying one or more data sources for historical data records associated with the plurality of input features;

simulating effects of lag on a performance of the machine learning model when operated under real-world conditions by using the lag feature to restrict a query for historical data records from at least one of the data sources to only historical data records available at a predetermined time prior to a time of the test procedure of the machine learning model, wherein the predetermined time is based on a known amount of lag associated with the at least one of the data sources;

receiving the historical data records from the one or more data sources at the machine learning model;

generating an output of the machine learning model; and generating one or more performance metrics of the machine learning model that are dependent on lag attributes based on the output of the machine learning model, wherein the one or more performance metrics comprise a performance decrement curve that illustrates how the performance of the machine learning model is affected with different amounts of lag built in for the at least one of the plurality of input features.

15. The system of claim 14, further comprising:

adjusting the lag feature to a different predetermined time;

executing an additional test procedure of the machine learning model; and analyzing the output of the test procedure with an output of the additional test procedure to determine how impactful the adjustment in the lag feature was to a result of the machine learning model.

16. The system of claim 15, further comprising:

generating a plurality of metrics for the test procedure and the additional test procedure; and comparing the plurality of metrics from each test procedure to determine how impactful each test procedure was to the machine learning model.

17. The system of claim 16, further comprising:

adjusting the machine learning model based on the metrics of the test procedure and the additional test procedure.

18. The system of claim 14, wherein:

the predetermined time is between about 3 hours and 48 hours.

19. The system of claim 14, wherein:

the lag feature is selected based on an expected lag of a given input feature of the plurality of input features.

* * * * *